(12) United States Patent
Clifford et al.

(10) Patent No.: US 11,853,615 B2
(45) Date of Patent: Dec. 26, 2023

(54) INCLUDING NETWORK STORAGE WITH DIRECT ATTACHED STORAGE

(71) Applicant: HITACHI VANTARA LLC, Santa Clara, CA (US)

(72) Inventors: Benjamin B. Clifford, Wayland, MA (US); Yan Liu, Shrewsbury, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 9 days.

(21) Appl. No.: 17/768,325

(22) PCT Filed: Oct. 16, 2019

(86) PCT No.: PCT/US2019/056461
§ 371 (c)(1),
(2) Date: Apr. 12, 2022

(87) PCT Pub. No.: WO2021/076117
PCT Pub. Date: Apr. 22, 2021

(65) Prior Publication Data
US 2023/0140654 A1    May 4, 2023

(51) Int. Cl.
*G06F 3/06* (2006.01)
(52) U.S. Cl.
CPC ............ *G06F 3/0665* (2013.01); *G06F 3/067* (2013.01); *G06F 3/0622* (2013.01)
(58) Field of Classification Search
None
See application file for complete search history.

(56) References Cited

U.S. PATENT DOCUMENTS

| | | | | |
|---|---|---|---|---|
| 9,454,441 | B2 * | 9/2016 | Elson | G06F 11/1662 |
| 10,936,224 | B1 * | 3/2021 | Koning | G06F 3/0614 |
| 2017/0083539 | A1 | 3/2017 | Saxena et al. | |
| 2021/0034468 | A1 * | 2/2021 | Patel | G06F 3/067 |
| 2021/0073089 | A1 * | 3/2021 | Sathavalli | G06F 9/45558 |

OTHER PUBLICATIONS

International Search Report of PCT/US2019/056461 dated Jan. 14, 2020.

* cited by examiner

*Primary Examiner* — Edward J Dudek, Jr.
*Assistant Examiner* — Ralph A Verderamo, III
(74) *Attorney, Agent, or Firm* — Mattingly & Malur, PC

(57) ABSTRACT

In some examples, a data node may provide a file system executed in a user space. The data node may invoke a device check process configured to perform a test for failure of a storage device associated with a target volume by sending a file system level request for obtaining metadata of data stored to the target volume. For instance, the target volume may be a virtual storage volume that represents storage capacity on a network storage. The user-space file system may receive the request for the metadata and may retrieve preconfigured metadata of the target volume that is stored locally in advance of the invoking of the device check process. The preconfigured metadata may be sent to the device check process in response to the request. For example, the preconfigured metadata may at least partially cause the target volume to pass the test.

15 Claims, 5 Drawing Sheets

| PATH | TYPE | UID | GID | OWNER PERMISSION | GROUP PERMISSION | OTHER USER PERMISSION | MODIFICATION DATE | POSIX FIELD 1 | ... | POSIX FIELD N |
|---|---|---|---|---|---|---|---|---|---|---|
| subdir/ | DIRECTORY | 1000 | 1000 | RWX | R-X | ... | 02/10/2002 | | ... | |
| subdir/bp/ | DIRECTORY | 1000 | 1000 | RWX | R-X | ... | 02/10/2002 | | ... | |
| subdir/bp/tmp/ | DIRECTORY | 1000 | 1000 | RWX | R-X | ... | 02/10/2002 | | ... | |
| subdir/bp/final/ | DIRECTORY | 1000 | 1000 | RWX | R-X | ... | 02/10/2002 | | ... | |

FIG. 3

INCLUDING NETWORK STORAGE WITH DIRECT ATTACHED STORAGE

TECHNICAL FIELD

This disclosure relates to the technical field of data storage in distributed systems.

BACKGROUND

Distributed file storage systems and various other types of distributed storage systems may include a plurality of data nodes that have direct attached storage. Despite typically having a plurality of directly attached storage devices, the storage capacity on these data nodes may become filled with data, and this data may become less and less relevant to current usage. However, permanent removal of the data from the respective data nodes may be undesirable, as the data might still be accessed periodically. Consequently, this can result in the processing and networking capabilities of these data nodes being left unused and therefore wasted. Furthermore, continually adding more data nodes to maintain available storage capacity and processing capacity in the storage system may increase equipment requirements, cooling requirements, networking requirements, floor space requirements, and so forth, and thus, is not a desirable alternative. Additionally, due to hardware configuration limitations, it may not be a viable solution to attach more storage devices to the data nodes.

SUMMARY

Some implementations include a data node that provides a file system executed in a user space. The data node may invoke a device check process configured to perform a test for failure of a storage device associated with a target volume by sending a file system level request for obtaining metadata of data stored to the target volume. For instance, the target volume may be a virtual storage volume that represents storage capacity on a network storage. The user-space file system may receive the request for the metadata and may retrieve preconfigured metadata of the target volume that has been stored locally in advance of the invoking of the device check process. The preconfigured metadata may be sent to the device check process in response to the request. For example, the preconfigured metadata may at least partially cause the target volume to pass the test.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example data structure for maintaining pre-configured file system metadata according to some implementations.

DESCRIPTION OF THE EMBODIMENTS

Figure 1:
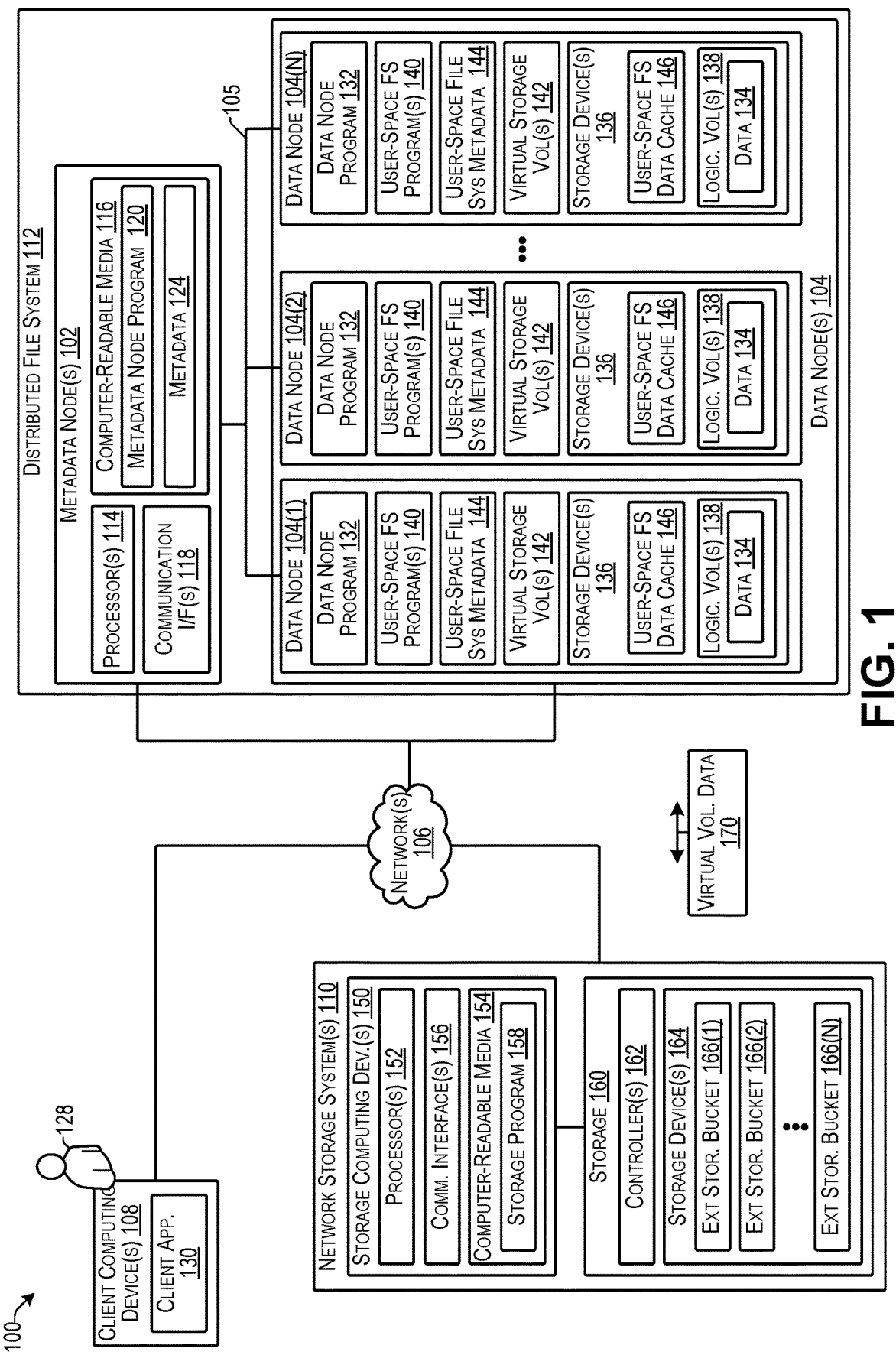
FIG. 1 illustrates an example architecture of a distributed storage system able to store and process data according to some implementations.

Some implementations herein are directed to techniques and arrangements for enabling an external network storage to be mounted through a user-space file system to a directory in a data node, such as in a virtual file system. For example, the network storage may be presented as a virtual local storage volume to data node. Furthermore, examples herein may prevent the distributed file system nodes from determining that a volume corresponding to the external storage has failed, e.g., as in the case of transient failures coming from the external storage or an intermediary, such as a network component or the like. For instance, based on how the distributed file system software tests a storage device for failure, implementations herein may provide preconfigured responses in reply to a storage drive check and/or volume check. Thus, the preconfigured responses may indicate to the distributed file system software that the volume corresponding to the external storage is healthy despite the occurrence of a transient communication failure. This feature can prevent a cascading effect in which the distributed file system might attempt to restore data on some or all of the external storage volumes on the data nodes connected to the network storage system due to a temporary failure in communications with the network storage, or the like.

Some examples herein may be used with a distributed storage system, such as an APACHE HADOOP distributed file system, a MapR file system, a cluster file system, or any other storage system that uses a plurality of data nodes having direct attached storage. As one example, the data nodes herein may each have a plurality of directly attached storage devices, such as solid state drives (SSDs), magnetic hard disk drives (HDDs), optical drives, or the like, capable of storing data in a persistent and rewritable manner. Examples of direct attached storage herein include one or more data storage devices directly attached to the respective computing device accessing the storage devices, as opposed to the computing device accessing the storage over a network (e.g., network attached storage). Further, in some cases, each storage device may correspond to a separate logical storage volume in a distributed file system provided by the distributed storage system. Thus, when the storage system performs a test of storage devices for failure, and one of the storage devices is determined to have failed, the distributed storage system may restore the failed logical volume on a different storage drive, e.g., on the same data node or on a different data node using a replica (copy) typically stored on a different data node.

The external network storage herein may be provided over one or more networks by one or more external network storage systems, such as may be referred to as cloud storage in some cases, and may be presented to a respective data node as any other direct attached storage drive attached to the respective data node. Thus, the external network storage may be essentially a virtual direct attached storage device providing a corresponding virtual storage volume to the data node. The data stored to the virtual storage volume by the data node may be stored to the external storage at a network storage location over the network(s). For instance, the external storage may maintain a plurality of storage buckets, such as a separate bucket corresponding to a separate virtual storage volume on respective ones of the data nodes.

Some examples herein may employ a user-space file system for the virtual storage volume, such as may be provided using the FUSE (Filesystem in Userspace) file system interface and library, or the like. For example, by using the FUSE interface, which is available under the GNU General Public License, a user-space file system may be created in the user space, e.g., without editing operating system kernel code, such as in LINUX, UNIX, etc. The user-space file system herein enables interception of kernel-level file system operations at the user-space level. The intercepted file system operations may be translated into application programming interface (API) commands (e.g., REST API or the like) that may be issued over the network to the network storage system instead of to the local direct attached storage of the respective data node in the distributed storage system. Accordingly, implementations herein may provide network-attached storage that may be treated as, and which may function as, a direct attached storage in a data node. Further, implementations herein are not limited by the number of data nodes in a distributed storage system, but may be scaled to any practical number of data nodes.

For discussion purposes, some example implementations are described in the environment of a HADOOP distributed file system operating on a distributed storage system with a plurality of data nodes. However, implementations herein are not limited to the particular examples provided, and may be extended to other types of file systems, other types of storage system architectures having a plurality of data nodes with direct attached storage, other types of storage protocols, other types of network-based storage configurations, other types of data and metadata, and so forth, as will be apparent to those of skill in the art in light of the disclosure herein.

FIG. 1 illustrates an example architecture of a distributed storage system 100 able to store and process data according to some implementations. The system 100 includes one or more metadata computing devices, referred to herein as metadata node(s) 102, that are able to communicate with, or otherwise coupled to, a plurality of data nodes 104(1), 104(2), . . . , 104(N) (collectively referred to as "data nodes 104"), such as through one or more networks 105. Further, the metadata node(s) 102 and the data nodes 104 may be able to communicate over one or more network(s) 106 with one or more client computing devices 108, which may be any of various types of computing devices, as discussed additionally below. In addition, at least the data nodes 104 are able to communicate over the one or more networks 106 with one or more external network storage systems 110 configured to provide external storage to the data nodes 104.

In the illustrated example, the metadata node(s) 102 and the data nodes 104 are included in a distributed file system 112. As one example, the distributed file system 112 may be a HADOOP distributed file system, although implementations are not limited to the HADOOP file system. In the case of a HADOOP file system, the metadata node 102 may be a name node and the data nodes 104 may be configured as a file system cluster to perform map-reduce processing using data stored on the data nodes 104, as is known in the art.

In some examples, the metadata node(s) 102 may include one or more servers that may be embodied in any number of ways. For instance, the programs, other functional components, and at least a portion of data storage of the metadata node(s) 102 may be implemented on at least one server, such as in a cluster of servers, a server farm, a data center, a cloud-hosted computing service, and so forth, although other computer architectures may additionally or alternatively be used. In the illustrated example, the metadata node(s) 102 include, or may have associated therewith, one or more processors 114, one or more computer-readable media 116, and one or more communication interfaces 118.

Each processor 114 may be a single processing unit or a number of processing units, and may include single or multiple computing units, or multiple processing cores. The processor(s) 114 can be implemented as one or more central processing units, microprocessors, microcomputers, microcontrollers, digital signal processors, state machines, logic circuitries, and/or any devices that manipulate signals based on operational instructions. As one example, the processor(s) 114 may include one or more hardware processors and/or logic circuits of any suitable type specifically programmed or configured to execute the algorithms and processes described herein. The processor(s) 114 may be configured to fetch and execute computer-readable instructions stored in the computer-readable media 116, which may program the processor(s) 114 to perform the functions described herein.

The computer-readable media 116 may include volatile and nonvolatile memory and/or removable and non-removable media implemented in any type of technology for storage of information, such as computer-readable instructions, data structures, program modules, or other data. Such computer-readable media 116 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the metadata node(s) 102, the computer-readable media 116 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 116 may be used to store any number of functional components that are executable by the processor(s) 114. In many implementations, these functional components comprise instructions or programs that are executable by the processor(s) 114 and that, when executed, specifically program the processor(s) 114 to perform the actions attributed herein to the metadata node 102. Functional components stored in the computer-readable media 116 may include a metadata node program 120, which itself may include one or more computer programs, applications, executable code, or portions thereof. For example, the metadata node program 120 may provide communication functionality with the client devices 108 and the data nodes 104. In addition, the metadata node program 120 may manage the storage of data on the data nodes 104. For example, the metadata node program 120 may include executable instructions to maintain metadata 124 about the data stored on the data nodes 104, such as a file system index including storage locations, as well as information about the data nodes 104 themselves, volumes maintained on each of the data nodes 104, and so forth.

In addition, the computer-readable media 116 may store data, data structures, and other information used for performing the functions and services described herein. For example, the computer-readable media 116 may store the metadata 124 in a metadata database, index or other suitable data structure that is used and maintained by the metadata node program 120 when performing some of the functions described herein. The metadata node 102 may also include or maintain other functional components and data, which may include programs, drivers, etc., and the data used or generated by the other functional components. Further, the metadata node 102 may include many other logical, programmatic, and physical components, of which those described above are merely examples that are related to the discussion herein.

The one or more communication interfaces 118 may include one or more software and hardware components for enabling communication with various other devices, such as over the one or more network(s) 106. Thus, the communication interfaces 118 may include, or may couple to, one or more ports that provide connection to the network(s) 105 and 106 for communicating with the data nodes 104 and the client computing devices 108. For example, the communication interface(s) 118 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The networks 105 and 106 may include any suitable network, including a wide area network (WAN), such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. As one non-limiting example, the network 105 may include a LAN, while the network(s) 106 may include the Internet or other WAN. The networks 105 and/or 106 may include both wired and/or wireless communication technologies. Components used for such communications can depend at least in part upon the type of network, the environment selected, or both. Protocols for communicating over such networks are well known and will not be discussed herein in detail. Accordingly, the metadata node(s) 102, the data nodes 104, the client computing device(s) 108, and the network storage system(s) 110 are able to communicate over the networks 105 and/or 106 using wired or wireless connections, and combinations thereof.

Each client computing device 108 may be any suitable type of computing device such as a desktop, laptop, tablet computing device, mobile device, smart phone, wearable device, and/or any other type of computing device able to send data over a network. A user 128 may be associated with a respective client computing device 108, such as through a respective user account, user login credentials, or the like. Furthermore, the client computing device 108 may be able to communicate with the metadata node(s) 102 and the data nodes 104 through the one or more networks 106 or through any other suitable type of communication connection.

Further, each client computing device 108 may include a respective instance of a user application 130, that may execute on the respective client computing device 108, such as for communicating with the metadata node program 116, e.g., for determining the location of data on the data nodes 104. In addition, the application 130 may be executed to communicate with the data nodes 104 directly in some cases, such as for accessing the data, causing execution of one or more programs on the data nodes 104, such as for processing the data (e.g., performing a map-reduce function, or the like, in the case of a HADOOP distributed file system). In some cases, the application 130 may include a browser or may operate through a browser, and the metadata node program 120 may include a web application for enabling the user to access stored data based on communication with the metadata node(s) 102. Alternatively, in other cases, the application 130 may include any other type of application having communication functionality enabling communication with the metadata node program 120 and/or the data nodes 104 over the one or more networks 106.

The data nodes 104 may each include a data node program 132 that may manage the storage of data 134 on a plurality of storage devices 136 directly attached to the data node 104. In the illustrated example, a plurality of logical volumes 138 may be managed on each data node 104, such as in a configuration of one logical volume 138 per storage device 134, although other configurations may be used in other examples.

In addition, to provide network attached external storage to individual ones of the data nodes 104, one or more user-space file system program(s) 140 may execute on each data node 104 to provide one or more virtual storage volumes 142. For example, each virtual storage volume 142 may appear to the data node program as a logical volume 138, but may actually represent data stored at the network storage system(s) 110. The user-space file system program(s) 140 on each data node 104 may manage the file system for the virtual storage volume(s) 142 for that data node 104. As mentioned above, the user-space file system program(s) 140 may use the FUSE interface or the like to provide essentially a proxy or virtual file system for the virtual storage volume(s) 142 in the user space (i.e., outside the operating system kernel space), so that the proxy file system may provide a bridge to the actual kernel interfaces. For example, as is known in the art, the kernel space is strictly reserved for running a privileged operating system kernel, kernel extensions, and most device drivers. On the other hand, the user space may include a memory area where application software and some drivers typically execute. Accordingly, the user-space file system program(s) 140 execute outside the kernel space and the FUSE interface may provide an interface between the resulting user-space file system and the operating system kernel where filesystem-level commands are typically executed. In some examples, the operating system on the data nodes 104 may be Linux, but examples herein are not limited to any particular operating system.

Furthermore the user-space file system program(s) 140 may maintain user-space file system metadata 144 that includes information about the data stored via the virtual storage volume on the network storage system(s) 110, such a storage location, as well as other metadata information, e.g., owner, storage policy, and so forth. The user-space file system metadata 144 may include an in-memory metadata cache to persist file system metadata locally and provide extremely fast metadata inquiry performance. The metadata cache may contain the entirety of the file system metadata for the virtual storage volume(s) 142, or the metadata cache may be bounded, in which case the metadata cache may persist the most recently accessed metadata. Under this configuration, metadata inquiries may be serviced from the metadata cache if the metadata requested is in the metadata cache. If the requested file system metadata is not already in the metadata cache, the metadata may be read from the network storage system 110 and added to the metadata cache of the user-space file system metadata 144. The least recently accessed metadata may be removed from the metadata cache to make room for the metadata.

Further, as discussed additionally below, the user-space file system metadata 144 may include preconfigured metadata that may be used by the user-space file system for responding to a device check inquiry from a device check process, such as in the case that the data node program 132 determines to check or otherwise test the health of the virtual storage volume(s) 142. For instance, the preconfigured metadata may include directory information or the like that can be used to respond to requests from the device check process for verifying health of the virtual storage volume, even in cases in which the network storage system may be unreachable.

In addition, the user-space file system program(s) 140 may maintain a user-space file system data cache 146 in one or more of the storage devices 136. For example, the user-space file system data cache 146 may include data recently retrieved from the network storage system 110 by the data node 104. Thus, user-space file system data cache 146 may include an on-disk data cache to persist virtual storage volume data locally and provide faster data read performance for recently retrieved data. Storage for the user-space file system data cache 146 may be allocated from a local directly attached HDD or SSD of the storage devices 136. The user-space file system data cache 146 may persist as much recently accessed file data as possible for the allocated space limitations. Data read requests may be serviced from the user-space file system data cache 146 if the data requested is in the user-space file system data cache 146. If the requested file data is not already in the user-space file system data cache 146, the requested data may be read from the network storage system (e.g., using a GET command) and added to the user-space file system data cache 146. In some examples, the least recently accessed data may be removed from the user-space file system data cache 146 to make room for the new data. Additional details of the logical and hardware configuration of the data nodes 104 herein are discussed below.

The storage system(s) 110 may include one or more storage computing devices 150, which may include one or more servers or any other suitable computing device, such as any of the examples discussed above with respect to the metadata node 102. The storage computing device(s) 150 may each include one or more processors 152, one or more computer-readable media 154, and one or more communication interfaces 156. For example, the processors 152 may correspond to any of the examples discussed above with respect to the processors 114, the computer-readable media 154 may correspond to any of the examples discussed above with respect to the computer-readable media 116, and the communication interfaces 156 may correspond to any of the examples discussed above with respect to the communication interfaces 118.

In addition, the computer-readable media 154 may include a storage program 158 as a functional component executed by the one or more processors 152 for managing the storage of data on a storage 160 included in the storage system(s) 110. The storage 160 may include one or more controllers 162 associated with the storage 160 for storing data on one or more storage devices 164, or the like. For instance, the controller 162 may control the storage devices 164, such as for configuring the storage devices 164 in a RAID configuration, JBOD configuration, or the like, and/or for presenting logical units based on the storage devices 164 to the storage program 158, and for managing data, such as data objects or other data, stored on the storage devices 164. The storage devices 164 may be any type of storage device, such as hard disk drives, solid state drives, optical drives, magnetic tape, combinations thereof, and so forth. In some examples, the network storage system(s) 110 may include commercially available cloud storage as is known in the art, while in other examples, the network storage system(s) 110 may include private or enterprise storage systems accessible only by an entity associated with the data nodes 104.

According to various data policies or the like, data on the data nodes 104 stored in direct attached storage in one or more of the logical volumes 138 may be moved over time to the network storage system(s) 110 by migrating the data to the virtual storage volume(s) 142. Data that is likely to be used frequently or in the near future may be retained in the logical volumes 138. For example, when using the data nodes 104 to perform compute jobs, data may typically be processed more quickly when stored in direct attached storage (i.e., in the logical volumes 138) as compared to data stored over a network at the network storage system(s) 110 (i.e., in the virtual storage volume(s) 142. Examples of data policies for managing the location of data storage are discussed additionally below.

In the illustrated example, the storage devices 164 may be logically configured to include a plurality of external storage buckets 166. For example, there may be one or more external storage buckets 166 for each data node 104. In the illustrated case, an external storage bucket 166(1) may receive data stored to the virtual storage volume(s) 142 of the data node 104(1); an external storage bucket 166(2) may receive data stored to the virtual storage volume(s) 142 of the data node 104(2); and an external storage bucket 166(N) may receive data stored by the data node 104(N) to the virtual storage volume(s) 142 of the data node 104(N). For example, the user-space file system program(s) 140 executing on each data node 104 may implement an API to send virtual volume data 170 to the corresponding external storage bucket 166 and/or may implement the API to retrieve virtual volume data from the correct external storage bucket 166. As mentioned above, the user-space file system program(s) 140 may maintain user-space file system metadata 144 to enable sending and retrieval of the virtual volume data 170. In some cases, there may be a separate external storage bucket 166 for each respective virtual storage volume 142, while in other cases, the same external storage bucket 166 may be used for all the virtual storage volumes 142 existing on the same data node 104 (e.g., one external storage bucket 166 per data node 104). As one example, external storage buckets are not shared between data nodes 104, but may be dedicated to a single user-space file system program instance. This arrangement may guarantee that the metadata maintained by the user-space file system program 140 is correct and that data in the external storage bucket 166 has not been modified by some other actor. Numerous other variations will be apparent to those of skill in the art having the benefit of the disclosure herein.

In some examples, the data nodes 104 may be arranged into one or more groups, clusters, systems or the like. Further, in some examples (not shown in FIG. 1) the metadata node(s) 102 may be arranged in pairs in which a first metadata node 102 may be coupled to a second metadata node 102 so that together they form a computing node (such as a name node in the case of a HADOOP distributed file system) for providing storage and data management services to a plurality of the client computing devices 108. For instance, the first metadata node 102 may act as a primary computing device, while the second metadata node 102 may act as a secondary computing device, at least with respect to maintaining the metadata 124, and may take over from the primary computing device in case of failure, or the like. Numerous other configurations will be apparent to those of skill in the art having the benefit of the disclosure herein.

In the example of FIG. 1, suppose that the distributed file system is a HADOOP distributed file system (HDFS). As is known in the art, HDFS may be deployed on a group of many computers to solve problems involving massive amounts of data and computation. The computers in HDFS may include at least one name node (e.g., the metadata computing device 102 in this example) and a plurality of data nodes 104. The data nodes 104 provide storage in the form of direct attached storage (DAS) and also provide the computational capacity required by the HDFS network.

In HDFS, logical volumes 138 may be used to store blocks and block replicas, which are pieces of files which are stored in the data nodes 104. Each file stored in HDFS may be divided into smaller pieces called "blocks". Each block may be copied some number of times to "block replicas", and block replicas of a block may be stored in different logical volumes 138 on different data nodes 104. In this way each block is protected from volume failures, storage device failures, and/or data node failures. Each HDFS logical volume may map to a single folder on the file system of a data node 104. In addition, there may be a single logical volume 138 per DAS device (e.g., per single solid state drive or hard disk drive) on the data node 104.

Accordingly, in HDFS, the stored data is protected by storing multiple copies of each block on different data nodes 104 and in different logical volumes 138. In this way, if an individual data node 104 fails or if a storage device 136 corresponding to a particular logical volume 138 fails, one or more copies of each block on the failed device are safely stored on another storage node 104. HDFS is designed to be deployed on inexpensive commodity hardware, so the design assumes DAS failures may be relatively common. Because DAS failures are common, and because stored data becomes inadequately protected when a logical volume 138 has failed (e.g., the storage device 136 corresponding to the particular logical volume 138 has failed), HDFS may be configured to quickly detect volume failures and re-protect the data that was on the failed volume as soon as possible by making new copies of the lost blocks and block replicas on a healthy volume.

As one example, when a logical volume 138 in HDFS fails, the logical volume 138 may be removed permanently from the storage pool of the respective data node 104. For instance, the failed DAS storage device 136 may be removed, a healthy new storage device 136 may be installed in its place, and the new storage device 136 may be presented to HDFS as a new logical volume 138. Thus, after a particular logical volume 138 has been identified as a failed volume, there is no mechanism to recover the failed volume or the blocks and block replicas stored on the failed volume other than by coping the lost data from other volumes to a new volume.

In the case of the virtual storage volumes 142 herein, a data protection policy such as that used by HDFS or other distributed file systems may cause serious problems when applied to a network attached storage, such as may be provided to the data nodes 104 by the network storage system(s) 110 via the virtual storage volumes 142 herein. For example, in the case of network attached storage, there is a risk of a shared component such as a network switch, other network component, communication interface on the data node, or a communication interface on the network storage system may incur a temporary or otherwise transient failure.

When such a failure is detected by one of the data nodes 104, even though the failure may be transient, the data node 104 may determine that the virtual storage volume 142 has failed and may mark the corresponding virtual storage volume(s) 142 as permanently failed. In addition, the data node 104 may initiate re-protection of the data that was stored on the virtual storage volume 142, such as by initiating copying of all the blocks and replica of blocks that were stored on the virtual storage volume(s) 142. This action may be repeated by numerous data nodes 104 in the distributed file system 112, which may cause a cascading data migration action on all or at least a large number of the data nodes 104. Furthermore, if the replica blocks of the lost data were also all stored on the virtual storage volumes 142 of respective different data nodes 104, then the corresponding data may be lost. Consequently, when the transient failure has been resolved, there may be no way to recover the failed virtual storage volumes 142. For example, the HDFS try to re-protect the lost data by making new copies which could take hours or days, even when the transient failure may only have lasted a minute or two.

To avoid this eventuality, implementations herein may prevent the data nodes 104 from determining that a virtual storage volume 142 corresponding to the network storage system 110 has failed, such as in the case of transient failures or the like. For instance, based on how HDFS or other distributed file system software checks storage devices and the virtual storage volume 142 for failure, implementations herein may intercept the communications inside the data nodes 104 and may substitute preconfigured responses in reply to a failure check. For example, the preconfigured response may indicate to the data node 100 for that the virtual storage volume 142 is operating properly despite the occurrence of a transient failure, such as may prevent communication with the external storage bucket at the network storage system 110. Accordingly, the configuration herein is able to prevent the cascading data migration effect in which a distributed file system might attempt to restore data on a plurality of the virtual storage volumes 142 on the data nodes 104. Additional details of the technique are discussed below.

Figure 2:
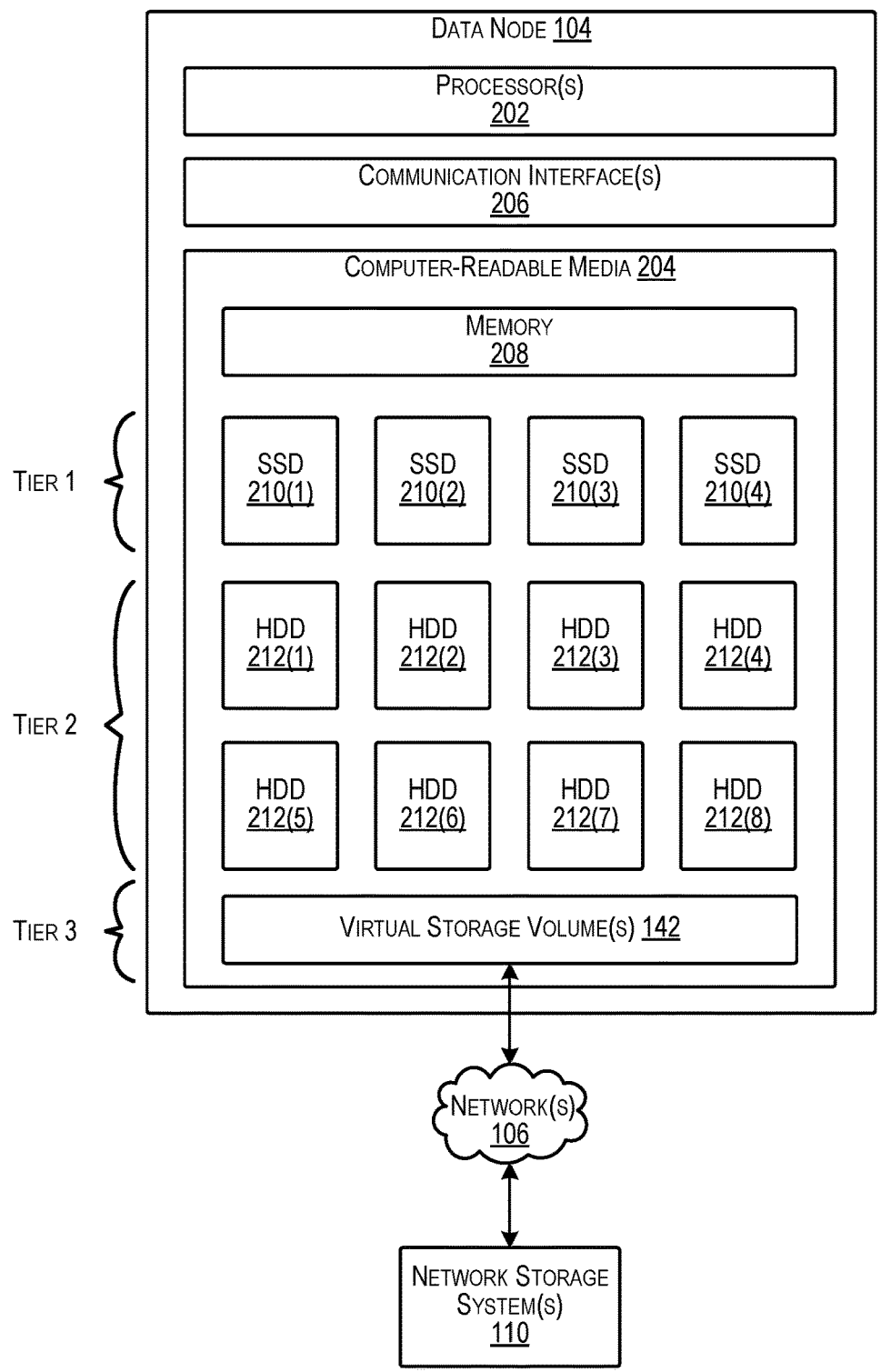
FIG. 2 illustrates an example hardware configuration of a data node according to some implementations.

FIG. 2 illustrates an example hardware configuration of a data node 104 according to some implementations. In some examples, the data node 104 may include a server, or the like, that may be embodied in any number of ways. For instance, the programs, other functional components, and at least a portion of data storage of the data node 104 may be implemented on at least a portion of a server, such as in a cluster of servers, a server farm, a data center, a cloud-hosted computing service, a server providing multiple virtual machines, and so forth, although other computer architectures may additionally or alternatively be used. In the illustrated example, the data node 104 may include, or may have associated therewith, one or more processors 202, one or more computer-readable media 204, and one or more communication interfaces 206.

Each processor 202 may be a single processing unit or a number of processing units, and may include single or multiple computing units, or multiple processing cores. The processor(s) 202 can be implemented as one or more central processing units, microprocessors, microcomputers, microcontrollers, digital signal processors, state machines, logic circuitries, and/or any devices that manipulate signals based on operational instructions. As one example, the processor(s) 202 may include one or more hardware processors and/or logic circuits of any suitable type specifically programmed or configured to execute the algorithms and processes described herein. The processor(s) 202 may be configured to fetch and execute computer-readable instructions stored in the computer-readable media 204, which may program the processor(s) 202 to perform the functions described herein.

The computer-readable media 204 may include a memory 208 and attached storage devices, such as solid state drives (SSDs) 210(1)-210(4), hard disk drives (HDDs) 212(1)-212(8), or any of various other types of storage devices (not shown in FIG. 2). The memory 208 may include volatile and nonvolatile memory and/or removable and non-removable media implemented in any type of technology for storage of information, such as computer-readable instructions, data structures, program modules, or other data. For example, the memory 113 may include, but is not limited to, RAM, ROM, EEPROM, flash memory or other memory technology. In addition, while four SSDs 210(1)-210(4) and eight HDDs 212(1)-212(8) are illustrated in this example, in other cases more or fewer storage devices may be used, different numbers of each type of storage device may be employed, the storage devices may be all of a same type, or different types of storage devices may be employed in addition to or as an alternative to those illustrated.

In some cases, the computer-readable media 204 may be all at the same location as the data node 104, while in other examples, as discussed above with respect to FIG. 1, a portion of the computer-readable media 204 may be partially remote from the data node 104, and may include a portion of storage in the network storage system(s) 110, which may be provided through the virtual storage volume(s) 142 or the like. Depending on the configuration of the data node 104, the computer-readable media 204 may include a tangible non-transitory medium to the extent that, when mentioned, non-transitory computer-readable media exclude media such as energy, carrier signals, electromagnetic waves, and/or signals per se.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the data node 104. As discussed above with respect to FIG. 1, functional components stored in the computer-readable media 204 may include the data node program 132 and the user-space file system program(s) 140.

In addition, the computer-readable media 204 may store data, data structures, and other information used for performing the functions and services described herein. For example, as discussed above with respect to FIG. 1, the data stored in the computer readable media 204 may include the user-space file system metadata 144 and the user-space file system data cache 146. In addition, the computer readable media 204 stores the data 134 stored in the logical volumes 138 and the virtual storage volume(s) 142. The data node 104 may also include or maintain other functional components and data, which may include programs, drivers, etc., and the data used or generated by the functional components. Further, the data node 104 may include many other logical, programmatic, and physical components, of which those described above are merely examples that are related to the discussion herein.

The one or more communication interfaces 206 may include one or more software and hardware components for enabling communication with various other devices, such as over the one or more network(s) 105 and/or 106. Thus, the communication interfaces 206 may include, or may couple to, one or more ports that provide connection to the network(s) 105 and/or 106 for communicating with the storage system(s) 110, the metadata node(s) 102, and the client computing devices 108. For example, the communication interface(s) 206 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

In the illustrated example, the data nodes 104 may be used with a variety of distributed storage systems and/or analytics platforms, such as may be built with APACHE HADOOP, CLOUDERA, HORTONWORKS software, or the like. For instance, in the case of a HADOOP distributed file system (HDFS), each data node 104 may store a plurality of logical volumes, such as with a single HDFS logical volume corresponding to a single storage device. Further, to protect against data loss, these file systems may often store three instances (block replicas) of each file, file portion, or other piece of data. For instance, for frequently accessed data (e.g., hot) all three block replicas might be stored on the fastest and most expensive storage tier (e.g., the SSDs 210 corresponding to tier 1), guaranteeing fast access to this data. Further, occasionally accessed data (e.g., warm) there may be a balance between the need for speedy access and economical storage by placing two of the replicas on the slower and more economical storage volumes (e.g., the HDDs corresponding to tier 2), while keeping a single replica on the fastest storage tier (e.g., tier 1). In this case speedy access is still provided unless there is a volume failure on the tier 1 copy, in which case there are still backups on slower tier 2 storage. Finally when the data becomes infrequently accessed (e.g. cold) economy is favored over performance and all of the block replicas may be stored on the slower tier of storage, providing greater economy, but still keeping the data available in real time so there is never an interruption in the ability to access the data.

In such a system, the cold data may eventually fill up all of the storage capacity. The addition of the virtual storage volume(s) 142 enables the storage/file system to decouple how the storage and processing capacity for the system may be scaled. For example, while HDFS and other file systems have built in tiering capabilities, as discussed above, if HDFS and similar file systems configured for direct attached storage add an external network attached storage as an additional storage tier, there is a substantial risk of data loss, system-wide failure, or the like, because the file system software is configured to assume that the data is being tiered between independent, direct attached storage devices 210 or 212 within the data node 104.

On the other hand, implementations herein enable the addition of external storage volumes to the data nodes 104 to safely tier data between direct attached and external storage. For example, as illustrated in FIG. 2, the data node 104 may have three types (tiers) of storage available for use as storage volumes. The directly attached SSDs 210 may represent a first tier having a highest price and highest performance; the directly attached HDDs 212 may represent a second tier having a midrange price and performance. Further, the virtual storage volumes provided via the external network storage system(s) 110 may provide a virtually unlimited third tier having a lower price and lower performance than the first two tiers. Accordingly, implementations herein provide additional storage capacity to distributed storage systems that operate using software that is configured to be used with direct attached storage.

FIG. 3 illustrates an example data structure 300 for maintaining pre-configured file system metadata according to some implementations. The preconfigured metadata in this example may include preconfigured directories with file system metadata. The data structure 300 includes a path 302, a type 304, a user ID 306, a group ID 308, owner permission 310, group permission 312, other user permission 314, modification date 316, and POSIX fields 1-N 318. For example, the path 302 may indicate the path of the subject object. The type 304 may indicate the object type such as directory, data file, link, etc. Further, the UID 306 may be the user ID associated with the object and the GID 308 may be the group ID associated with the object. In addition, the owner permission 310 may indicate the permissions of the owner such as read, write, execute, while the group permission 312 may indicate the permissions of the group. In addition, various other types of metadata may be included in the preconfigured file system metadata, such as other user permission 314, modification date 316, and POSIX fields 318 which may indicate portable operating system interface standards, APIs, or the like that may be applied. Furthermore, while various examples of preconfigured metadata have been illustrated in data structure 300, various other types of standard file system metadata may be included in other examples as will be apparent to those of skill in the art having the benefit of the disclosure herein. As discussed below, the preconfigured metadata may be used to respond to file system inquiries in the case of transient failure of communications with the network storage system 110 to prevent the cascading failure described above by ensuring the virtual storage volumes are able to pass a device check, or the like, regardless of the status of any components upon which the virtual storage volume depends.

Figure 4:
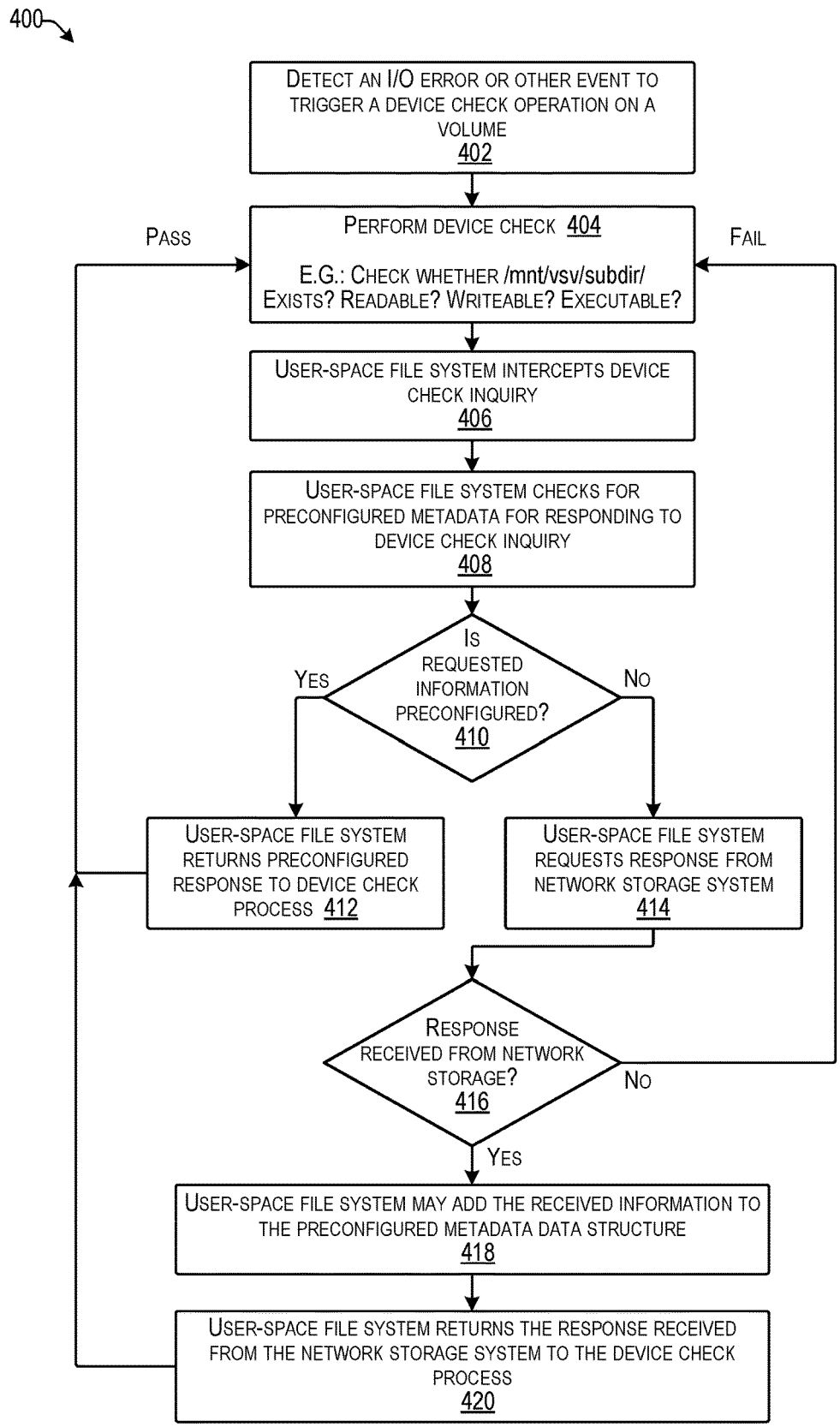
FIG. 4 is a flow diagram illustrating an example process for responding to a device check process according to some implementations.
Figure 5:
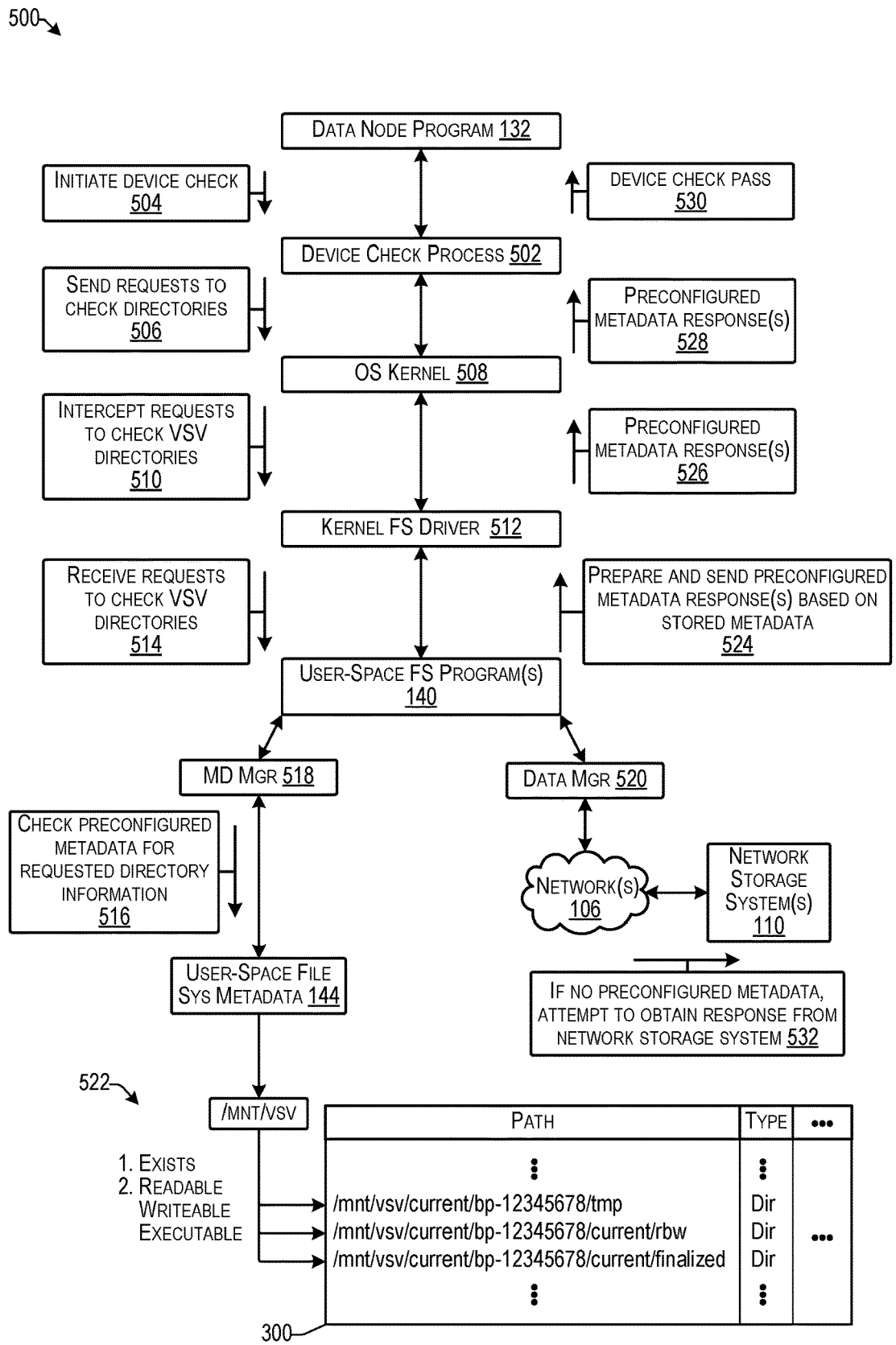
FIG. 5 illustrates an example logical arrangement and flow diagram for the user-space file system program(s) to intercept file system level commands according to some implementations.

FIGS. 4 and 5 include flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 4 is a flow diagram illustrating an example process 400 for responding to a device check process according to some implementations. In some cases, the process 400 may be executed at least in part by a respective data node 104 or other suitable computing device. As one example, the data node program 132 and the user-space file system program(s) 140 executed by the one of more processors 202 of a data node 104 may include executable instructions for performing at least part of the process 400 of FIG. 4.

As mentioned above with respect to FIG. 3, preconfigured metadata may be used to provide non-error responses to file system metadata inquiries in the face of a network partition or other communication failure between the mounted file system and the network storage system.

At 402, the computing device may detect an input/output (I/O) error or other event to trigger a device check operation on a volume. As one example, suppose that a transient network event causes an I/o error or the like while a data node 104 is attempting to read a file stored on the network storage system via the virtual storage volume 142, such as a file having the path "/mnt/vsv/subdir/bp/final/lvl3/file.txt", where "vsv" is the virtual storage volume.

At 404, the computing device may perform a device check on the volume corresponding to the detected I/O error. For example, in response to the I/O error caused by the transient event, the data node 104 may initiate execution of a device check process on the virtual storage volume /mnt/vsv/, e.g., by first checking whether the directory "/mnt/vsv/subdir/" exists, and is readable, writeable and executable. In some cases, the device check process may be included a part of the data node program 132 discussed above with respect to FIG. 1. In other cases, the device check process may be a separate program invoked by the data node program 132.

As one example, in the case of an HDFS configuration for the distributed storage system herein, suppose that the data node program 132 detects a failure during normal operations. These normal operations might include reading, writing or deleting block replicas, or creating, removing or listing directories, among a variety of possible operations. When the data node program 132 detects a failure during normal operations, it may schedule or otherwise initiate execution of a device check process to determine if the failure is a general device failure, e.g., to determine whether one of the directly attached SSDs or HDDs has failed. The device check process may determine the health of the volume (and corresponding SSD or HDD storage device) by first checking the file system for the existence of specific directories stored by the storage device. If the directories exist, the device check process may then check the file system to ensure the directories are readable, writeable, and executable. If the directories do not exist or are not readable, writeable, and executable, the device check process may mark the volume as failed, and may initiate a process to re-protect the data that was stored on the failed volume/storage device. As mentioned above, typically a failed direct attached storage device might not be expected to recover, whereas in the case of network attached storage, the failure is likely not a failed storage device, but rather is more likely a transient failure of communication with the network storage system.

At 406, the user-space file system executing on the data node may intercept the device check inquiry. For instance, as discussed additionally elsewhere herein, the user-space file system may operate on a user level, and may be configured to intercept file system level commands, such as the device check inquiry.

At 408, the user-space file system may determine whether there is preconfigured metadata for responding to the device check inquiry.

At 410, the user-space file system determines whether the requested information is included in the preconfigured metadata. For example, when the mounted user-space file system software receives the metadata inquiry, the user-space file system may check to see if the path of the inquiry is one of the preconfigured paths such as by check in preconfigured metadata data structure, e.g., as discussed above with respect to FIG. 3. If the requested information is include in the data structure, the process goes to 412. If not, the process goes to 414.

At 412, when the requested information, e.g., the requested path is preconfigured, the user-space file system may create a successful response from the preconfigured metadata, and may return the preconfigured metadata to the device check process in response to the inquiry. The response may cause the device check process to pass that path.

At 414, on the other hand, when the requested path is not preconfigured in the preconfigured memory data structure, the user-space file system may request a response from the network storage system. For example, the transient failure may or may not have ended by the time the device check is performed.

At 416, the user-space file system determines whether a response is received from the network storage system. If so, the process goes to 418. If not, the device check on that path fails due to the network failure or other transient event. In some cases, the device check process may continue to check other directories in the virtual storage volume, while in other cases, the device check process may determine that the virtual storage volume has failed, and may proceed with re-protecting the data stored thereon.

At 418, in some examples, the user-space file system may add the received information to the preconfigured metadata data structure to ensure that the preconfigured metadata is available should a subsequent device check be directed toward the particular directory.

At 420, the user-space file system may return the response received from the network storage system to the device check process. For example, by returning the proper response, the device check on path "/mnt/vsv/subdir/" passes the device check inquiry. In some examples, the device check process may continue for one or more additional directories. In other examples, the device check process may terminate.

FIG. 5 illustrates an example logical arrangement and flow diagram 500 for the user-space file system program(s) 140 to intercept file system level commands according to some implementations. As mentioned above, the data node program 132 may initiate a device check process 502, or the like, to determine whether the storage device for a logical storage volume has failed. In the case that the logical storage volume suspected of failure is actually a virtual storage volume 142 used to store data to the network storage system(s) 110, the user-space file system program(s) 140 may intercept the device check requests for responding to prevent the virtual storage volume 142 from being marked as failed.

In the illustrated example, at 504, the data node program 132 may initiate the device check process 502, such as in response to detecting an I/O failure or other type of failed operation, as enumerated elsewhere herein.

At 506, the device check process may send, to the operating system kernel 508, requests such as for checking directories or for otherwise determining the health of the suspect volume and/or storage device.

At 510, a kernel file system driver 512 may be configured to intercept file system level requests directed the virtual storage volume(s) (VSVs) 142. As one example, the user-space file system program 140 may use FUSE or other file system interface to mount the user-space file system program 140 to a directory for the virtual storage volume 142 on the data node 104. To the data node program 132, the virtual storage volume 142 may be presented as any other local file system logical volume, but its data and metadata may be stored in an external storage bucket 166 (not shown in FIG. 5) at the network storage system 110. When data is written to the virtual storage volume 142, the write may be translated to a command (e.g., a PUT command) on the network storage system 110, and the data may be stored to the network storage system via an API (e.g. a REST API, or the like). When data is read from the virtual storage volume 142, the user-space file system program 140 may translate the read request to a GET command, or the like and request the data via the API. As discussed above, to provide better performance, the user-space file system program 140 may maintain local caches for data and metadata, which may reduce the number of REST operations for retrieving data or metadata from the network storage system 110.

At 514, the user-space file system program 140 may receive the request to check the virtual storage volume directories intercepted by the kernel file system driver 512. For example, the user-space file system program 140 may use the kernel file system driver 512 to intercept device check requests, or the like, directed to the virtual storage volume 142. Thus, the user-space file system program 140 is able to prepare a response to the device check request and reply to the device check process to prevent the virtual storage volume 142 from being marked as a failed volume, such as in the event of a transient network failure.

At 516, the user-space file system program 140 may implement a metadata manager 518 as a module or separate program to check the user-space file system metadata 144 for preconfigured metadata for providing the requested directory information. In addition, the user-space file system program 140 may implement a data manager 520 as a module or separate program to communicate with the network storage system(s) 110. As mentioned above, to respond to the device check requests, the user-space file system program 140 may be provided with preconfigured metadata, such as directory metadata in the case of HDFS, and/or other types of metadata, depending on the type of distributed file system being used. In the case of HDFS, when the directory metadata has been preconfigured and stored in a data structure, such as the preconfigured metadata data structure 300 discussed above with respect to FIG. 3, there is no need for the user-space file system program 140 to send a request to the network storage system 110 for responding to metadata inquiries targeting those preconfigured directories. Accordingly, the user-space file system program 140 is able to respond to the requests from the device check process 502 even when the network storage system 110 cannot be communicated with.

As one example, at start time, the preconfigured metadata may be loaded into the metadata data structure included in the user-space file system and then pinned to the user-space file system metadata 144 in a memory cache so that responses to system metadata inquiries are answered from the memory cache first, if possible, from the preconfigured metadata data structure 300. The specific directories or other metadata that are preconfigured may vary based on the implementation of the device check process implemented by the particular distributed file system, or the like, being used. For instance, in the case of HDFS, the directories that may be targeted by the device check process can be determined through code inspection, empirical command capture, or the like. To pass the device check, the preconfigured metadata may further include metadata for the ancestors of targeted directories, which may also be used to return successful results. For this reason, the configuration may include the targeted directories as well as the ancestors of those directories. For example, if the targeted device check directories are "subdir/bp/final/" and "subdir/bp/tmp/", a file system inquiry into the existence of either directory might fail if the device check process determines that that the ancestor (parent) directories, e.g., "subdir/bp/" or "subdir/" of the targeted directories do not exist.

At 522, suppose that the targeted directories are "/mnt/vsv/current/bp-12345678/tmp", "/mnt/vsv/current/bp-12345678/current/rbw", and "/mnt/vsv/current/bp-12345678/current/finalized". The metadata manager 518 may determine from the preconfigured metadata data structure 300, metadata related to these directories, e.g., as discussed above with respect to FIG. 3, to indicate that these directories (1) exist, and (2) are readable, writeable, and executable.

At 524, the user-space file system program 140 may prepare and send a preconfigured metadata response based on the stored preconfigured metadata to the kernel file system driver 512, which passes the preconfigured metadata response to the operating system kernel 508, as indicated at 526. For example, the response may include information about the targeted directory, such as preconfigured information about the existence, type (file, directory, link), size, UID, GID, modification time, access time, mode, or other POSIX metadata of the preconfigured directory, file, etc.

At 528, the operating system kernel 508 may provide the preconfigured metadata response to the device check process.

At 530, when all of the device check requests have been responded to, the device check process may send an indication to the data node program 132 that the suspect volume has passed the device check.

At 532, on the other hand, if the user-space file system program 140 is unable to respond to any of the device check requests from the preconfigured metadata data structure 300, the user-space file system program 140 may cause the data manager 520 to attempt to send a request to the network storage system 110. For example, if the event that caused the device check to be initiated was a transient communication failure, it is possible that the communications with the network storage system 110 may have been restored. If so, the user-space file system program 140 may prepare and send a response based on the metadata information received from the network storage system 110. If not, the user-space file system program 140 may respond without providing the necessary metadata, which may result in the virtual storage volume failing the device check.

Further those of skill in the art having the benefit of the disclosure herein will understand that the manner in which the preconfigured directories and other preconfigured metadata are configured, modified, and deleted may vary based on the specific implementation. For instance, the configuration might be hardcoded into the user-space file system program 140 software source code, encoded into a configuration file that might be manually edited by a system administrator, or maintained in a database that is manageable by an end user through a command line or graphical user interface. The examples provided herein may be based on the device check process logic being fairly static, so that hard code the configuration in the software is a viable option.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as programs stored on computer-readable media, and executed by the processor(s) herein. Generally, programs include applications, routines, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these modules and techniques may be stored on computer-readable storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
   a data node including one or more processors; and
   one or more non-transitory computer-readable media storing executable instructions that configure the one or more processors of the data node to perform operations comprising:
      mounting, to a directory of the data node, a user-space file system executed in a user space on the data node, wherein the data node includes a plurality of network attached storage devices and a plurality of logical storage volumes configured on the network attached storage devices according to a distributed file system;
      invoking, on the data node, a device check process configured to perform a test for failure of a storage device associated with a target volume by sending a file system level request for obtaining metadata of data stored to the target volume, wherein the target volume is a virtual storage volume representative of data stored on a network storage with which the data node is able to communicate over a network;
      receiving, by the user-space file system, the file system level request for the metadata of the target volume;
      retrieving, preconfigured metadata of the target volume stored locally on the data node in advance of the invoking of the device check process; and
      sending the preconfigured metadata to the device check process in response to the request for metadata from the device check process, wherein the preconfigured metadata causes, at least in part, the target volume to pass the test.

2. The system as recited in claim 1, wherein the data node is included in a plurality of data nodes in the distributed file system, each data node including at least one of the virtual storage volumes representative of respective data stored on the network storage, wherein at least some of the plurality of data nodes store copies of data stored on at least some other ones of the plurality of data nodes.

3. The system as recited in claim 2, wherein:
the network storage is configured with a plurality of storage buckets; and
individual instances of the user-space file system on the respective data nodes correspond to respective individual buckets on the network storage.

4. The system as recited in claim 1, the operations further comprising storing the preconfigured metadata in a data structure that includes directories of data stored to the virtual storage volume and, for individual directories, at least one of a metadata type, a user identifier, a group identifier, owner permissions, group permissions, a modification date, or a POSIX field.

5. The system as recited in claim 1, wherein the test comprises:
determining that a specified directory exists on the target volume; and
based on determining that the specified directory exists, determining that the specified directory is at least one of readable, writeable, or executable.

6. The system as recited in claim 1, the operations further comprising:
receiving, as part of the test, a request for additional metadata of the target volume;
determining that preconfigured metadata is not available for responding to the request for the additional metadata; and
sending a request to the network storage for the additional metadata.

7. The system as recited in claim 1, the operations further comprising storing, in a memory cache on the data node, metadata for at least a portion of the data stored to the network storage via the virtual storage volume.

8. The system as recited in claim 1, wherein the invoking, on the data node, the device check process is in response to determining, by the one or more processors, a failure of an operation instruction with respect to the virtual storage volume, the failure of the operation instruction comprising at least one of a data read request, a data write request, or an execution request.

9. The system as recited in claim 1, wherein the failure of the operation instruction is due to a transient failure in communication between the data node and the network storage.

10. The system as recited in claim 1, the operations further comprising:
in response to a request for data stored to the virtual storage volume, retrieving, via the user-space file system, the data from the network storage system;
storing the retrieved data in a data cache on a storage device attached to the data node; and
deleting, from the data cache previously retrieved data to accommodate, at least in part, the retrieved data in the data cache.

11. The system as recited in claim 1, wherein the distributed file system is a HADOOP distributed file system, the distributed file system further comprising at least one name node and a plurality of data nodes including the data node.

12. One or more non-transitory computer-readable media storing instructions that, when executed by one or more processors, program the one or more processors to perform operations comprising:
providing a user-space file system executed in a user space on a data node;
invoking, on the data node, a device check process configured to perform a test for failure of a storage device associated with a target volume by sending a file system level request for obtaining metadata of data stored to the target volume, wherein the target volume is a virtual storage volume representative of data stored on a network storage with which the data node is able to communicate over a network;
receiving, by the user-space file system, the file system level request for the metadata of the target volume;
retrieving preconfigured metadata of the target volume that was stored locally on the data node in advance of the invoking of the device check process; and
sending the preconfigured metadata to the device check process in response to the request for metadata from the device check process, wherein the preconfigured metadata causes, at least in part, the target volume to pass the test.

13. The one or more non-transitory computer-readable media as recited in claim 12, wherein the user-space file system is mounted to a directory of the data node, wherein the data node includes a plurality of network attached storage devices and a plurality of logical storage volumes configured on the network attached storage devices according to a distributed file system.

14. A method comprising:
providing, by one or more processors, a user-space file system executed in a user space on a data node;
invoking, on the data node, a device check process configured to perform a test for failure of a storage device associated with a target volume by sending a file system level request for obtaining metadata of data stored to the target volume, wherein the target volume is a virtual storage volume representative of data stored on a network storage with which the data node is able to communicate over a network;
receiving, by the user-space file system, the file system level request for the metadata of the target volume;
retrieving preconfigured metadata of the target volume that was stored locally on the data node in advance of the invoking of the device check process; and
sending the preconfigured metadata to the device check process in response to the request for metadata from the device check process, wherein the preconfigured metadata causes, at least in part, the target volume to pass the test.

15. The method as recited in claim 14, further comprising mounting the user-space file system to a directory of the data node, wherein the data node includes a plurality of network attached storage devices and a plurality of logical storage volumes configured on the network attached storage devices according to a distributed file system.

* * * * *